May 8, 1923.

A. MacKENZIE

COUPON BOOK

Filed Aug. 27, 1918

1,454,447

Inventor
Allister MacKenzie
By
Strong & Townsend
Attorneys

Patented May 8, 1923.

1,454,447

UNITED STATES PATENT OFFICE.

ALLISTER MacKENZIE, OF OAKLAND, CALIFORNIA.

COUPON BOOK.

Application filed August 27, 1918. Serial No. 251,629.

*To all whom it may concern:*

Be it known that I, ALLISTER MACKENZIE, a citizen of the United States, residing at Oakland, in the county of Alameda and State of California, have invented new and useful Improvements in Coupon Books, of which the following is a specification.

This invention relates to an accounting system.

It is the principal object of this invention to provide means for issuing individual slips of uniform size adapted to be marked to represent variable values, the total value of all the slips not exceeding a given amount. This object is accomplished by cancelling indelibly, obliterating, or otherwise indicating marks upon a control card and subsidiary sheets; the location of the marks indicating their value.

Another object of this invention is to eliminate the repetition of calculations in recording transactions or making accounting entries by providing sheets marked with values expressing the resulting calculations relative to a series of given units of value and designate an individual result of calculation to indicate and record the result of the transaction.

The use of this system is not confined to money values alone, but may be used for mileage, admission coupons, piece work records, tally cards, perpetual inventories and any other lines of mercantile and accounting work.

The present system contemplates the use of a master card or machine embodying a number of units, the sum total of which has been previously determined and which units are arranged in definite relation to each other so that the obliteration or designation of one or more of the units upon subsidiary sheets, as guided by the controlling elements, will, due to their location upon the sheet and their number, indicate certain units of time, measurement or other values.

The invention is illustrated by way of example in the accompanying drawings, in which—

Figure 1:
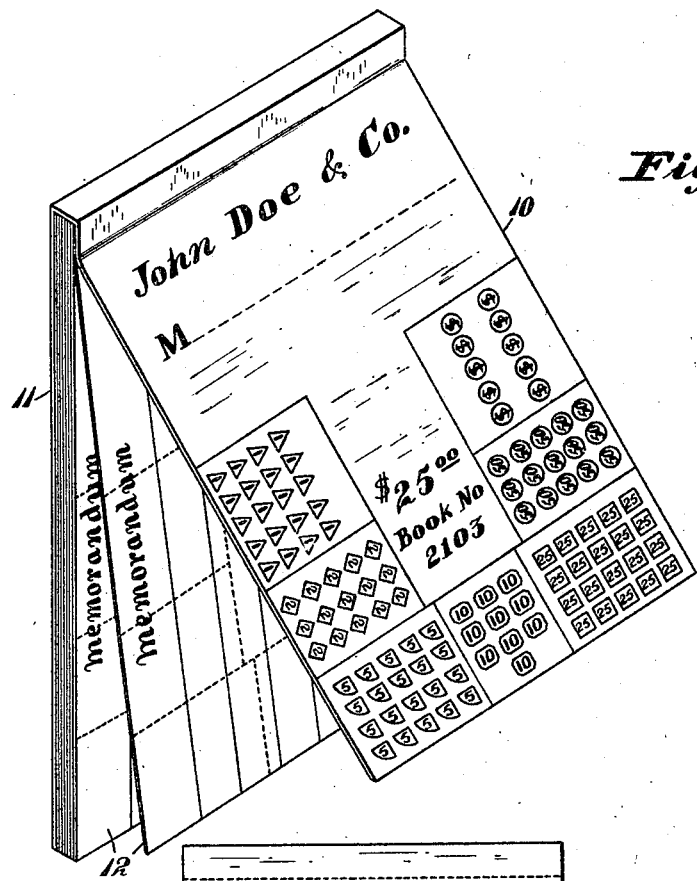
Fig. 1 is a view in perspective, illustrating the cover of the book and the coupon slips bound.

Referring more particularly to the drawings, 10 indicates a front cover, here shown as formed integral with a back 11. These two members are preferably made of cardboard of suitable thickness to ensure durability and service. Bound between the cover members is a pad of coupon slips 12. One face of each of these slips is appropriately ruled for memoranda, while the opposite side of each sheet is printed and ruled. In the present instance there are seven rectangular fields, to-wit: corner fields 13 and 14 and an intermediate field 15; fields 16 and 17 above the corner field 13; and fields 18 and 19 above the corner field 14.

Figure 2:
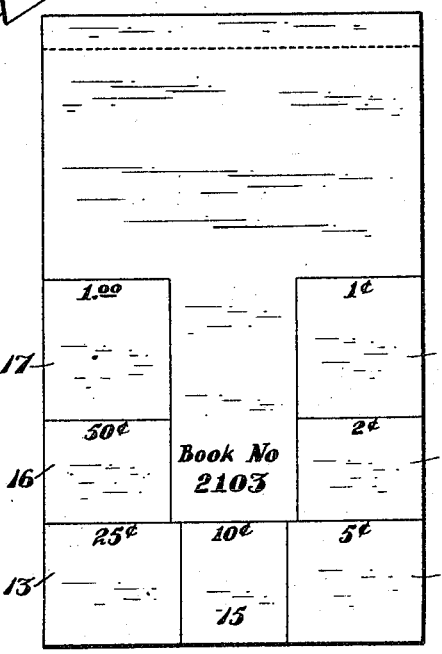
Fig. 2 is a view in plan, illustrating the arrangement of one of the coupon slips.

As particularly shown in Fig. 2, the field 17 is inscribed with a $1.00 mark; the field 16 with a 50¢ mark; the field 13 with a 25¢ mark; the field 15 with a 10¢ mark; the field 14 with a 5¢ mark; the field 18 with a 2¢ mark; and the field 19 with a 1¢ mark, for a purpose which will be hereinafter set forth. A book number is printed on each of the sheets 12 corresponding to the number printed on the cover of the book.

Inscribed on the front cover 10 are fields corresponding in denominational values, arrangement and position to the fields previously described and which for convenience will bear the same reference numerals. These fields, however, are filled with characters representing 1¢, 2¢, 5¢, 10¢, 25¢, 50¢ and $1.00. The sum total of the characters in the fields in the present instance will amount to $25.00.

In using this book, it is issued for a cash sum of $25.00 or may be used for credit, being secured by a note or other instrument. When a purchase is made, the book is presented to the merchant who swings the outer cover away from the pad and positions the adjacent leaf 12 of the pad beneath the cover, after which, by means of a punch or some other canceling device, certain characters in the various fields are obliterated, the sum total of which will represent the amount of the purchase. When a punch is used for this purpose the characters will be punched out and at the same time the slip 12 will be perforated in the various corresponding fields. After the purchase has been thus indicated on the back of the book and upon the coupon sheet, this sheet is torn from the book and placed on file or in a cash drawer. The number of perforations on this sheet and their location in the various fields will insure that the amount of purchases may be readily computed, and as each sheet bears the purchaser's book number the record of sales will be complete.

In case it is desired to designate the articles sold, the memorandum spaces may be used for that purpose. It will be seen that by the use of such a book uniform coupon sheets will be provided and an accurate record of a purchase recorded as well as the amount of the purchase correctly subtracted from the value of the book.

While I have shown the preferred form of my coupon book as now known to me, it will be understood that various changes in the construction, arrangement and combination of parts may be made by those skilled in the art without departing from the spirit of the invention as disclosed in the appended claims.

Having thus described my invention, what I claim and desire to secure by Letters Patent is—

1. In an accounting system means for separately and collectively recording a variable number of transactions of variable monetary value simultaneously and means for limiting the sum total of the variable values to a predetermined amount.

2. In an accounting system, means for determining a limited total of monetary values and means for separately and collectively recording a number of variable monetary values representing a variable number of transactions.

3. In an accounting system, a master card indicating a plurality of monetary units aggregating a predetermined sum, and a plurality of coupon slips, separately representing different transactions and adapted to be marked simultaneously with the cancellation of monetary units on the master card to indicate a desired variable monetary value for a variable number of transactions, the aggregate monetary value not exceeding the aggregate values on the master card.

4. In an accounting system, a master card indicating a plurality of monetary units aggregating a predetermined sum, and a plurality of coupon slips, separately representing different transactions and adapted to be marked simultaneously with the cancellation of monetary units on the master card to indicate a desired variable monetary value for a variable number of transactions, the aggregate monetary value not exceeding the aggregate values on the master card, and a memorandum space on each of said coupon slips for recording the details of the transaction.

5. A coupon book comprising a pad of coupon slips, each originally representing a transaction of unknown monetary value, the back of said slips being provided with a space for setting forth the details of the transaction, and the front of said slips being appropriately printed to form fields designated by different monetary units and a master card carrying a plurality of groups of monetary units arranged to register with corresponding monetary fields on the coupon slips, whereby perforations made in the master card to obliterate a desired number of the monetary units in the various fields on the master card will cause like perforations in the said card will cause like perforations in the various monetary fields on a coupon slip, thereby recording the monetary value of the transaction upon a slip and canceling that value from the monetary units upon the master card.

6. In an accounting system, means for separately and collectively recording a variable number of transactions of variable monetary value, and means for limiting the sum total of the monetary values representing each transaction to a predetermined amount.

7. A coupon book comprising a pad of coupon slips, a master card, said coupons and master card being imprinted with fields representing monetary values of different denominations, the fields on the master card and the coupon slips being in register whereby a variable number of transactions of variable monetary values may be separately and collectively recorded.

8. A coupon book comprising a pad of coupon slips, a master card, said coupons and master card being imprinted with fields representing monetary values of different denominations, the fields on the master card and slips being in register when superposed whereby a variable number of transactions representing variable monetary values may be separately and collectively recorded, and means whereby the sum total of the values representing each transaction may be limited to a predetermined amount.

In testimony whereof I have hereunto set my hand in the presence of two subscribing witnesses.

ALLISTER MacKENZIE.

Witnesses:
W. W. HEALEY,
M. E. EWING.